United States Patent Office 2,850,394
Patented Sept. 2, 1958

2,850,394

PROCESS FOR MAKING A NON-DUSTING EGG ALBUMEN PRODUCT

Chastain G. Harrel and Helen A. Baeder, Minneapolis, Minn., assignors to Pillsbury Mills, Inc., Minneapolis, Minn., a corporation of Delaware No Drawing. Application June 29, 1955
Serial No. 518,974

2 Claims. (Cl. 99—210)

This invention relates to anti-dusting treatment, and more particularly to treating dried egg albumen to prevent dusting thereof.

Egg whites or albumen, when dried for use in edible products, presents a dusting problem which is particularly acute if the albumen has been dried by a spray-drying process.

Many expedients have been attempted to eliminate or lessen the dusting characteristics of egg albumen, but all of these, to our knowledge, have been unsatisfactory either for economic reasons or because the anti-dusting agent is not acceptable as a pure food. One expedient which we have employed in the past involves the admixture of pan-dried flakes of egg white or albumen with the spray-dried product. The presence of pan flakes materially lessens the dusting property of the spray-dried portion, but does not eliminate the problem. Furthermore, the pan-drying process is much more expensive than the spray-drying process and it appears that the tendency of the present day egg drying technique is toward spray-drying. It is estimated that practically all of the egg albumen produced commercially in the future will be dried by conventional spray-drying methods.

The dusting problem in connection with dried egg albumen is not only costly but also presents an annoying problem with respect to the comfort of workmen. Egg albumen dust may be allergy-producing and where a workmen has become allergic to the dust, it appears that his tolerance for it is quickly lessened and sensitivity rapidly increased.

As to the economics of handling dried egg albumen, an appreciable loss is sustained every time the material is dry-mixed or poured in open atmosphere. Loss data obtained from several sources indicate that, in a normal handling operation, from 1% to 2% of the egg albumen may actually disappear in the form of dust. When it is considered that the product may be handled many times from the time it is originally spray-dried until it is moistened by a consumer, for example, where it is incorporated into a dry cake mix, it may be seen that the loss is a considerable factor.

While the dusting effect may be minimized to some degree by raising the moisture content, the keeping qualities of the dried egg albumen will then be put into jeopardy. Thus, if the moisture content is raised to around 12% or 13%, there will be a noticeable improvement in the anti-dusting of the product, but the shipping weight is increased, handling is made more difficult, and the shelf life of the product is materially reduced thereby. For this reason, the egg albumen is maintained close to 6% and the commercial product usually lies in a range of from 6% to 8% moisture. At this moisture level, the dusting problem is extremely acute, especially in the spray-dried product.

It is, therefore, a general object of this invention to provide a non-dusting egg albumen product together with a process for producing it wherein the resulting material will not be diluted or unnecessarily increased in weight but will be economically and effectively dust-free without placing the keeping qualities of the product in jeopardy.

More specifically, it is an object of the invention to provide an easily packaged and handled egg albumen product which has been rendered dust-free by surface coating with a small amount of an effective and harmless agent.

It is a still further object of the invention to provide an anti-dusting agent for spray-dried egg albumen which will be extremely effective in small qantities and yet will not affect deleteriously the flavor or use of the egg albumen in food products.

Our invention contemplates the surface coating of dried egg albumen so as to render the product completely non-dusty. To this end, we apply triethyl citrate in surface-coating relation with previously dried egg white or albumen by thorough intermixing.

It is not fully known why triethyl citrate functions so effectively in small quantities to accomplish the desired results, but it is thought that the effect may be attraction through electrical charges, or physical wetting, or may be a combination of these effects. The latter appears to be the case because such a small quantity of triethyl citrate will accomplish the results through some type of surface phenomenon. The treated dried egg albumen acquires a somewhat sticky appearance although, in fact, it is not at all sticky. The treated material coheres readily and, at the same time, adheres poorly to most articles with which it comes in contact. Thus, where a quantity of spray-dried egg albumen was surface-coated with as low as 0.03% triethyl citrate, and then placed in a glass container, the material readily fell away from the side walls of the container and left them completely clean. There was, of course, no evidence of dust in the internal atmosphere within the glass container since the anti-dusting effect was complete. The coherence of the product was increased by adding a larger percentage of triethyl citrate and 0.2% was found to give optimum anti-dusting characteristics while preserving good flowability. Even 0.3% triethyl citrate was satisfactory, but additional coherence did not appear to be warranted in view of the economics involved in the anti-dusting process.

In order to determine the effect of the triethyl citrate as an anti-dusting agent if homogeneously dispersed within each of the granular dustlike particles of egg albumen, the previously seletced optimum percentage, namely 0.2% of triethyl citrate was incorporated into fresh egg whites and the resultant product spray-dried in conventional manner. The product thus formed had bad dusting characteristics, adhered badly to the sides of a glass container and exhibited poor coherence in a manner practically identical to that evidenced by a control sample of spray-dried albumen of untreated conventional form.

In addition to the anti-dusting effect obtained by the surface coating of spray-dried egg albumen with the triethyl citrate, we have observed superior whipping effects when the product is utilized for angel food cakes and the like. The improvement of whipping properties and of beating tolerance of egg whites containing triethyl citrate is fully disclosed in Patent No. 2,637,654, but, in that patent, relates only to an egg white which has been mixed in wet condition with esters, including triethyl citrate, and then whipped in that form or dried and subsequently remoistened before whipping. As above noted, our experiments show that incorporating the triethyl citrate in the egg white before drying does not correct the dusting problem and, in fact, the observation of the dried product made in accordance with the teachings of the above noted patent would tend to suggest the ineffectiveness of such esters as triethyl citrate as anti-dusting agents.

In all uses which we have employed thus far including the anti-dusting egg albumen as an ingredient in white, layer, yellow and chocolate cakes, we have noted no bad effects over the same products made with the conventional dusty egg albumen and, in fact, note a certain measure of improvement in some of the desirable qualities such as cake volume and uniform texture.

Because of the effectiveness of our surface coating process in eliminating the dusting problem in connection with spray-dried egg albumen with but a small and inexpensive quantity of the surface coating triethyl citrate, a great economic saving can be effected and the conditions under which workmen must operate in the handling of the treated egg albumen have been fully demonstrated.

What we claim is:

1. A process for making a non-dusting egg albumen product consisting in drying fresh egg whites to a moisture level of about 6% water on the basis of the dried product, then coating the dried product particles with at least 0.03% of triethyl citrate.

2. A process for making a non-dusting egg albumen product consisting in spray-drying fresh egg whites to a dusty consistency, then admixing in surface relation with the previously spray-dried material from 0.03% to 0.3% triethyl citrate.

References Cited in the file of this patent

UNITED STATES PATENTS

| | | |
|---|---|---|
| 2,637,654 | Kothe | May 5, 1953 |
| 2,667,419 | Gooding et al. | Jan. 26, 1954 |